Oct. 20, 1964

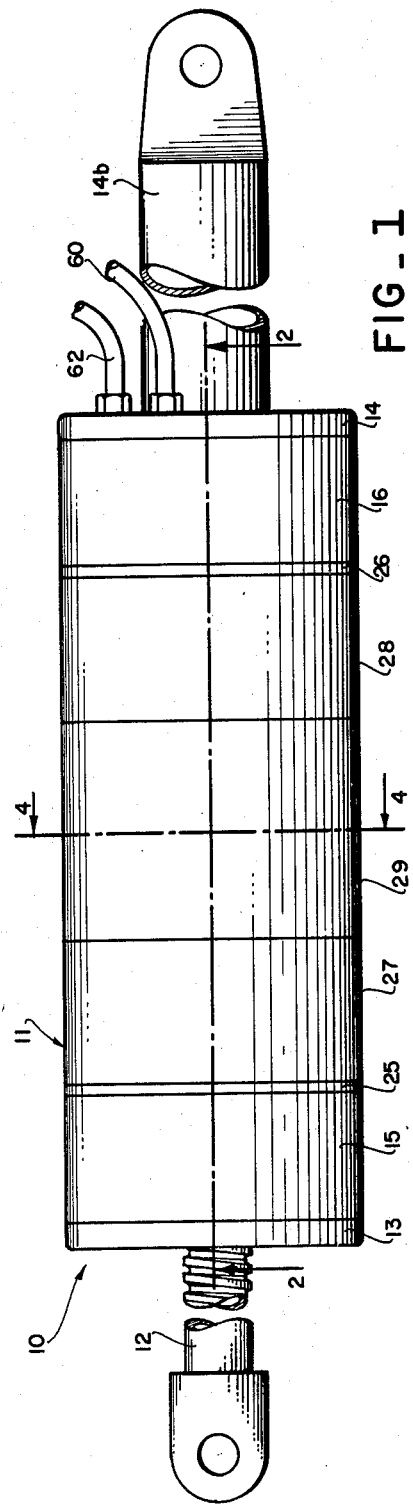

R. K. CALVERT 3,153,372

FLUID POWERED POSITIONER

Filed Oct. 1, 1962

INVENTOR.
RODNEY K. CALVERT

BY

*George C. Sullivan*
Agent

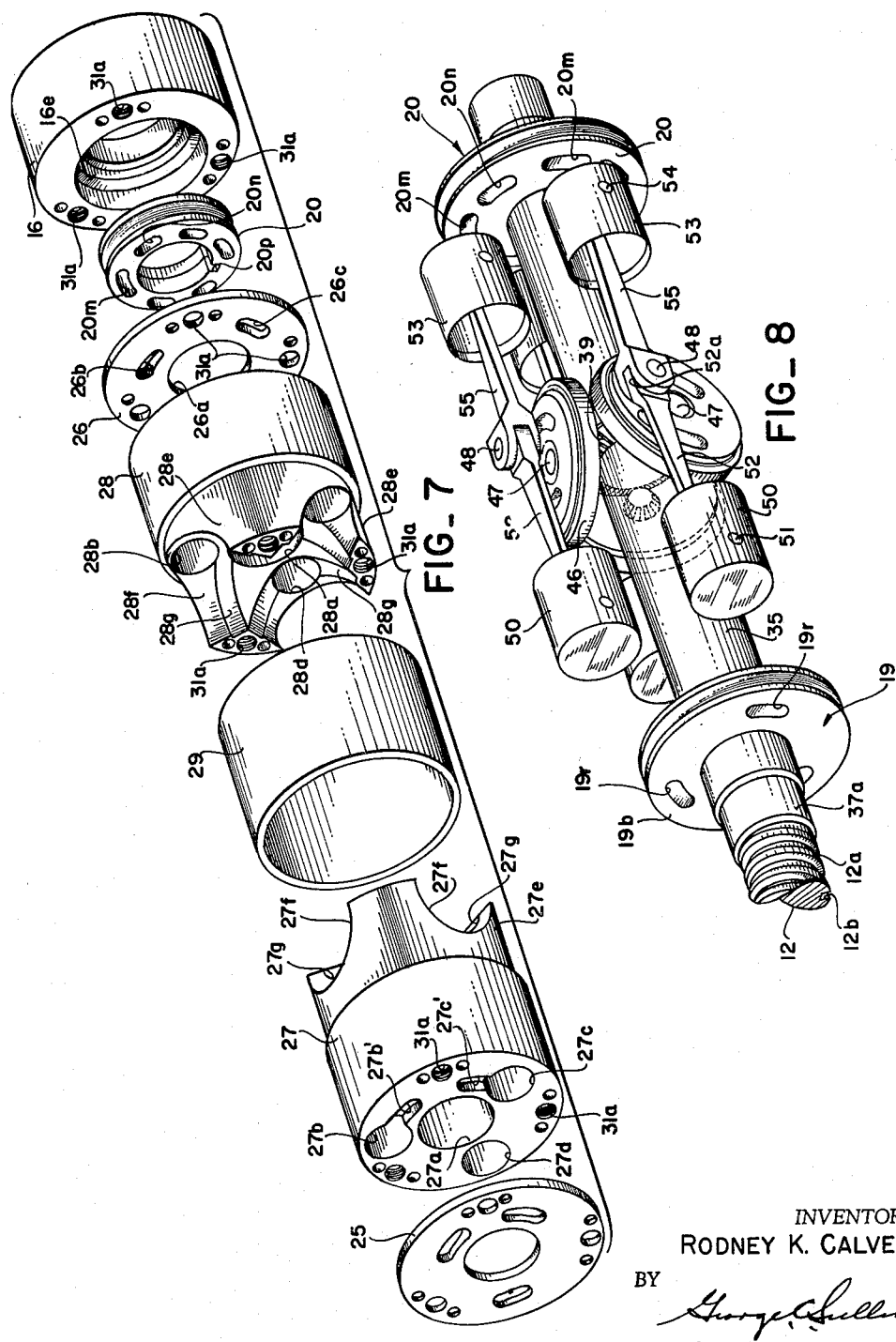

United States Patent Office 3,153,372
Patented Oct. 20, 1964

3,153,372
FLUID POWERED POSITIONER
Rodney K. Calvert, Dunwoody, Ga., assignor to Lockheed Aircraft Corporation, Burbank, Calif.
Filed Oct. 1, 1962, Ser. No. 227,444
7 Claims. (Cl. 91—175)

This invention relates to a fluid motor, and more particularly to a reversible pneumatic powered positioner.

Many benefits are obtained by the use of the positioner of this invention. Since the positioner may be operated by pneumatic pressure, it may be directly connected to the air supply found in most industrial facilities. Also, it is small and may therefore be stored and used in small areas, yet is very powerful for its size. The positioner is particularly adapted to position one element relative to a datum and has the important attribute of having interchangeable parts, thus minimizing the number of parts which must be stocked for its repair. Because the positioner is made up of sub assemblies which are held together preferably by three bolts, the time required to break down and service the positioner is minimized. Further, the positioner is dynamically balanced to minimize wear and tear caused by vibrations, thus increasing the length of time between servicings. Additionally, the positioner has positive-acting valves which are self-adjusting to compensate for valve wear, thus giving reliability of operation over long periods of time.

It is therefore an object of this invention to provide a pneumatic powered positioner having interchangeable parts.

It is another object of this invention to provide a dynamically balanced pneumatic powered positioner.

Another object of this invention is to provide a pneumatic motor having a simple, positive-acting, and self-adjusting valve mechanism.

A further object of this invention is to provide a pneumatic motor connected to a power output in a positive manner through internal gearing.

A still further object of this invention is to provide a plural piston pneumatic motor having a central power output transfer mechanism.

Another object of this invention is to provide a pneumatic powered positioner capable of producing relatively large output forces.

Other objects and advantages will become apparent from the following description taken in connection with the accompanying drawings in which:

FIGURE 1 is a side elevation view of one embodiment of a positioner constructed in accordance with this invention;

FIGURE 2 is a sectional view taken along lines 2—2 of FIGURE 1;

FIGURE 7 is an exploded view of the principal parts of the body of the positioner shown in FIGURE 1; and FIGURE 8 is a pictorial view of a drive means for the positioner shown in FIGURE 1.

Figure 3:
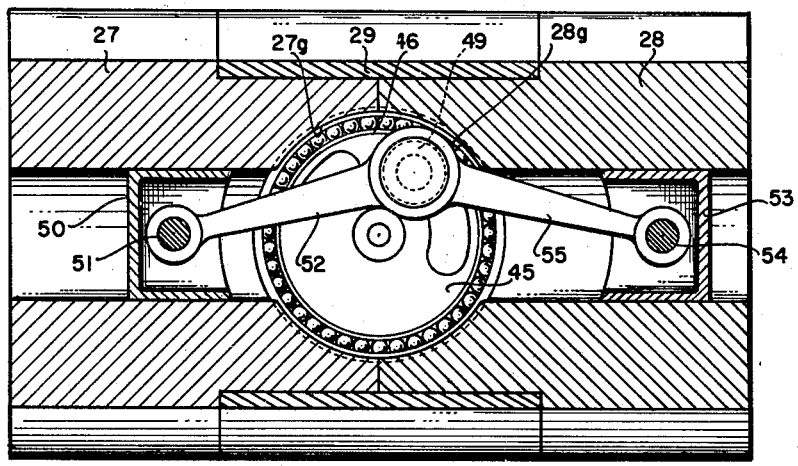
FIGURE 3 is a sectional view taken along lines 3—3 of FIGURE 4.

Generally stated, a preferred embodiment of this invention comprises an air powered positioner including a plurality of preferably three sets of piston assemblies connected through the intermediary of an eccentric to rotate a hollow cylinder threadedly connected with a screw mounted therein thereby actuating the screw axially relative to the rest of the positioner assembly. The piston assemblies are reciprocatingly actuated within cooperating cylinder bores in timed relation to one another by pneumatic pressure supplied to and exhausted from the cylinder bores through positive-acting, self-adjusting valve assemblies which are directly connected for rotation with the hollow cylinder.

Referring to the drawings, and more particularly to FIGURES 1, 2 and 7, the air powered positioner 10 comprises the housing or body 11 having end plates 13 and 14 at opposite ends thereof provided with central through holes 13a and 14a, respectively. A tubular connector 14b is secured as by welding to plate 14 in surrounding relation to through hole 14a. A pair of body portions 15 and 16 are disposed inwardly adjacent the end plates 13 and 14, respectively. Body portions 15 and 16 are provided with central through holes 15a and 16a, which are each counterbored at their outwardly facing ends to provide annular cutouts or seats 15b and 16b. The body portions are also counterbored at their interior ends to form annular cutouts or seats 15c and 16c, which have central annular grooves 15e and 16e, respectively, formed therein. Identical radial and axial thrust ball bearing assemblies 17 and 18 are received in each of annular cutouts 15b and 16b, respectively; and identical, self-adjusting valve assemblies 19 and 20 are received in each of annular cutouts 15c and 16c, respectively. Because the valve assemblies are identical, only valve assembly 19 will be described in detail, and the corresponding parts of valve assembly 20 will be given reference numerals corresponding thereto.

Figure 5:
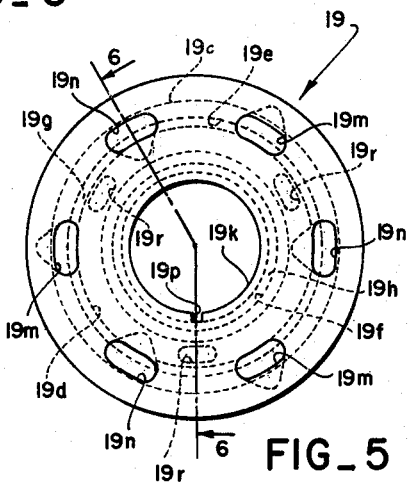
FIGURE 5 is a plan view of a valve assembly constructed in accordance with this invention.
Figure 6:
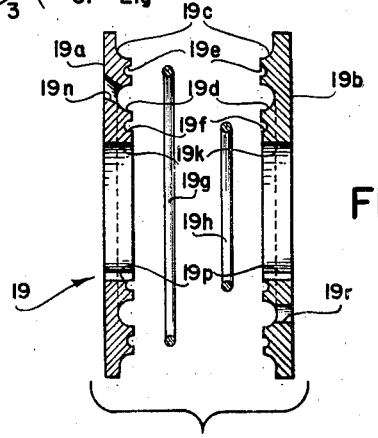
FIGURE 6 is a sectional side view of the valve assembly of FIGURE 5.

Valve assembly 19, shown in detail in FIGURES 5 and 6, comprises annular valve plate members 19a and 19b having mating annular cutouts or grooves 19c in the confronting sides thereof at the periphery of the plate, and mating central annular grooves 19d in the confronting sides of the plates. Annular grooves 19e and 19f are disposed on each side of annular groove 19d and receive O-rings 19g and 19h, respectively. Each of plates 19a and 19b is provided with a central through bore 19k and an axial key way 19p. Plate 19a is provided with a plurality of ports 19n and 19m intersecting grooves 19c and 19d, respectively, while the plate 19b has preferably three ports 19r intersecting groove 19d. The plates 19a and 19b are placed in juxtaposition with the O-rings 19g and 19h slightly in compression within annular grooves 19e and 19f. Valve assembly 19 is mounted within cutout 15c with plate 19a facing away from body portion 15 and plate 19b engaging body portion 15 with the ports 19r in fluid communication with annular groove 15e at all times, as can best be seen in FIGURE 2.

Platelike cylinder heads 25 and 26, FIGURES 2 and 7, are provided with central through bores 25a and 26a, respectively, and a plurality of cylinder ports 25b, 25c, 25d and 26b, 26c, 26d, best seen in FIGURE 7, with the exception of port 26d which is not visible. The cylinder heads 25 and 26 are mounted adjacent the interior ends of the body portions 15 and 16, respectively, to retain the valve assemblies 19 and 20 within annular cutouts 15c and 16c with the O-rings thereof slightly in compression. Valve assemblies 19 and 20 are adapted for rotation within cutouts 15c and 16c, respectively, and the O-rings in compression between the valve plates thereof render the valve assemblies self-adjusting by continuously biasing the valve plates into running fit sealing relation with their confronting body parts and cylinder heads.

Cylinder heads 25 and 26 are mounted on cylinder blocks 27 and 28, respectively; as best seen in FIGURE 7, the blocks 27 and 28, respectively, include central through bores 27a and 28a, and three cylinder bores 27b, 27c, 27d and 28b, 28c, 28d. Arcuately extending recesses 27b' and 27c' are formed in the face of block 27 and communicate with bores 27b and 27c. Bores 28b and 28c in block 28 are provided with similar arcuate recesses which are not visible. The arcuate recesses are provided so that each of the bores 27b, 27c, 28b and 28c will be alternately communicated with fluid supply and exhaust passages in a predetermined timed relation. Cylinder blocks 27 and 28 are of reduced exterior diameter at their confronting ends to form annular seating areas 27e and 28e which are adapted to receive an annular cover plate 29. The confronting ends of the blocks 27 and 28 are also provided with three identical, axially directed, symmetrically related, arcuate cutouts 27f and 28f each having their transition point on a radial line drawn from the center of the cylinder block through the center line of a corresponding cylinder bore. Cutouts 27f and 28f are each provided with recesses 27g and 28g, respectively, to form retaining seats for drive eccentrics as will be described in detail hereinafter. The above described stationary body parts are held assembled in cooperating engagement with one another by draw bolts 31 extending through corresponding bores 31a in the body parts to form the body 11.

Figure 4:
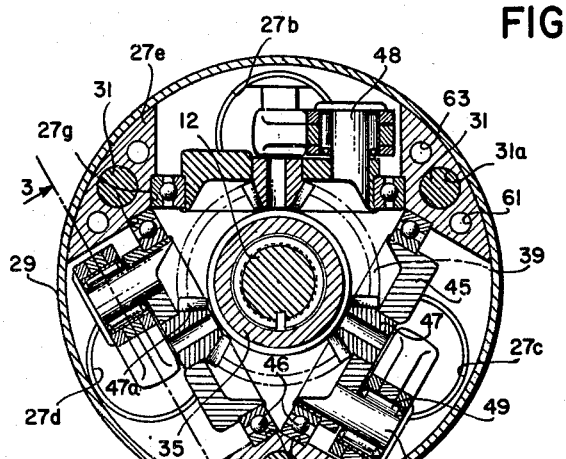
FIGURE 4 is a sectional view taken along lines 4—4 of FIGURE 1.

A hollow cylinder 35, FIGURES 2, 4 and 8, having internal threads 36 is mounted within the central through bore of the body 11. The exterior surface of the cylinder 35 is provided with a centrally located annular bevel gear 39 and reduced end portions 37a and 37b, forming annular seats which guidably receive the inner races of the axial and radial thrust absorbing bearing assemblies 17 and 18, respectively. Valve assemblies 19 and 20 are each secured to the exterior surface of cylinder 35 for rotation therewith by a key 38 which cooperates with the slot in each valve assembly and corresponding slots in the cylinder.

A screw 12 is provided having external screw threads 12a which matingly engage the threads 36 for actuation of screw 12 by rotation of cylinder 35. The screw 12 and cylinder 35 together form a power output or transfer mechanism. In order to assure prevention of rotation of screw 12 as cylinder 35 is rotated, the through hole 13a of end plate 13 is provided with a protuberance 13b riding in slot 12b extending axially along the periphery of screw 12; the coaction of protuberance 13b in slot 12b and the coaction of screw threads 36 and 12a, serving to axially extend and retract screw 12 relative to cylinder 35 as cylinder 35 is rotated.

Referring more specifically to FIGURES 2, 3, 4 and 8, driving of cylinder 35 is accomplished by a plurality of piston assemblies mounted within body 11 in the openings provided by the cutouts 27f and 28f of the cylinder blocks 27 and 28 with the pistons being located in the cylinder bores 27b, 27c, 27d and 28b, 28c, 28d. Since the piston assemblies are identical, only one will be described in detail. Each piston assembly comprises an eccentric 45 including a surrounding ball bearing 46. The outer race of the ball bearing 46 is mounted in the annular seat formed by mating annular recesses 27g and 28g, FIGURE 3. Eccentric 45 has a center shaft or pinion 47 provided with pinion gear teeth 47a which are in mesh with the gear teeth of the bevel gear 39. Eccentric 45 also has an offset shaft 48 surrounded by needle bearing assembly 49 to which the pistons 50 and 53 are connected by connecting rods 52 and 55, respectively. Piston 50 is connected by a connecting pin 51 to one end of connecting rod 52, and the other end 52a of connecting rod 52 is connected to crank or offset shaft 48 by mounting in surrounding relation on the outer race of bearing assembly 49. The other piston 53 is connected by a connecting pin 54 to one end of connecting rod 55 which rod is bifurcated at its other end 55a and connected to offset shaft 48 in a manner similar to connecting rod 52, the rod ends 52a and 55a being interconnected on offset shaft 48 in a tongue and yoke arrangement.

For communicating the cylinder bores to supply and exhaust, the body 11 is provided with a conduit 60, FIGURE 2, communicating passage 61 formed in the body 11 with body grooves 15e and 16e, and a conduit 62 communicates passage 63 formed in the body 11 with the annular grooves 19c and 20c in valves 19 and 20, respectively.

In operation, the conduit 60 is connected to a source of driving fluid, preferably air, and the conduit 62 is connected to exhaust. Assuming that the pistons 50 and 53 are in the position shown in FIGURE 2, cylinder bore 27b will be connected in fluid communication with passage 63 by recess 27b', port 25b in cylinder head 25, valve port 19n, and valve exhaust cutout 19c; while fluid passage 61 will be connected in fluid communication with cylinder bore 28b by valve ports 20r, valve groove 20d and valve port 20m of valve plate assembly 20, port 26b in cylinder head 26 and recess 28b' (not visible). The valve ports 19m and 20n are closed when valve ports 19n and 20m are open by reason of their not being in alignment with the ports in cylinder heads 25 and 26, respectively. In a like manner the valve ports 19m and 20n are open when the valve ports 19n and 20m are closed.

Air supplied to cylinder bore 28b through conduit 60 will cause piston 53 to reciprocate inwardly toward the center of the actuator to drive the offset shaft 48 of eccentric 45 counterclockwise in the direction of arrow 70. Concomitantly, the piston 50 will be driven outwardly with respect to the center of the actuator to exhaust fluid in the cylinder bore 27b through passage 63 and conduit 62. In response to this movement the pinion 47 of the eccentric 45 will be rotated relative to bevel gear 39 to cause the hollow cylinder 35 to rotate in the direction of the arrow 80, FIGURE 2, to thereby retract the actuator screw 12 into the cylinder 35. It will be appreciated that by reversing the supply and exhaust connections as by a four-way valve that the motion of the eccentric 45, the cylinder 35, and screw 12 may be reversed.

The ports 19m and 19n, 20m and 20n, in valve plate assemblies 19 and 20, respectively, are disposed relative to the ports in the cylinder heads 25 and 26 such that as the piston 53 approaches the inward extremity of its stroke and the piston 50 reaches the outward extremity of its stroke, the rotation of hollow cylinder 35 will have caused the inlet port in the valve assembly 20 to close and the exhaust port in the valve assembly 20 to open while at the same time closing the outlet port in the valve assembly 19 and opening the inlet port in the valve assembly 19. In this manner, the drive means comprising pistons 50 and 53 is readied for a second cycle of operation. Subsequent cycles of operation of the pistons 50 and 53 are effected in a like manner. When three piston assemblies are used as in the preferred embodiment, each set of pistons is operated through three complete cycles of operation for each revolution of the hollow cylinder 35, and the several sets of drive means are in various stages of their strokes in timed relation with respect to one another so that each piston will be carried over the dead spot in its stroke by another piston. It will be appreciated that the gear ratio between the piston assemblies and the hollow cylinder, the spacing of the ports in the valve plate assemblies 19 and 20, the spacing of the ports in the cylinder heads, and the spacing of the recesses intersecting the cylinder bores could be arranged to accommodate the timed operation of any reasonable number of sets of piston assemblies. It will be further appreciated from the foregoing that the positioner of this invention is self-locking even under heavy load conditions in the event of pressure fluid supply failure during operation if the helix angle of the threads interconnecting cylinder 35 and screw 12 is not too great. Further, the stroke of the positioner may be varied simply by replacing actuator screw 12 and connector 14b with corresponding parts of different length.

While a particular embodiment of the invention has been illustrated and described, it will be obvious to those skilled in the art that various changes and modifications may be made without departing from the invention; and it is intended to cover in the appended claims all such

What is claimed is:

1. In an air motor: supply and exhaust means; an elongate housing; a central axial through bore formed in said housing; a cylindrical rotatably actuated power transfer mechanism mounted within said central bore; a plurality of symmetrically related sets of axially directed opposed cylinder bores in said housing spaced about said central axial bore each having inlet and outlet ports in their opposed ends connecting each of said cylinder bores with said supply and exhaust means; pistons operatively disposed in each of said cylinder bores; each of said pistons being drivingly connected to rotatably actuate said transfer mechanism; and rotatably actuated plate valve means mounted in cooperating relationship with the inlet and outlet ports in the opposed ends of said cylinder bores to communicate said cylinder bores in timed relation with said supply and exhaust means for actuation of said pistons, said valve means being connected for actuation by said transfer mechanism.

2. In an air motor: supply and exhaust means; an elongate housing; a central axial through bore formed in said housing; a cylindrical rotatably actuated power transfer mechanism mounted within said central bore; a plurality of symmetrically related sets of axially directed opposed cylinder bores in said housing spaced about said central axial bore each having inlet and outlet ports at their opposed ends; a piston operatively disposed in each of said cylinder bores, each of said pistons being drivingly connected to rotatably actuate said transfer mechanism; and rotary plate valve means cooperating with the inlet and outlet ports in the opposed ends of said cylinder bores to communicate said cylinder bores in timed relation with said supply and exhaust means, said valve means being connected for actuation by said transfer mechanism.

3. In an air motor: a housing; a central axially directed bore formed through said housing; a cylindrical power transfer mechanism having a substantially centrally located annular bevel gear rotatably mounted in said bore; a plurality of sets of opposed axially directed cylinder bores mounted about said central bores; a set of piston assemblies including connecting rods operatively disposed in a corresponding set of said cylinder bores; and an eccentric for each of said sets of piston assemblies rotatably mounted in said housing, each of said eccentrics having a central pinion gear drivingly engaging said bevel gear and an offset connection to which the connecting rods of each corresponding set of piston assemblies are drivingly connected.

4. In an air motor: a housing; a central bore formed through said housing; a cylindrical power transfer mechanism having a substantially centrally located annular bevel gear rotatably mounted in said bore; a plurality of sets of opposed cylinder bores in axial alignment with said bore mounted in symmetrically spaced relation about said bore; a plurality of sets of piston assemblies including connecting rods operatively disposed in corresponding sets of said cylinder bores; and an eccentric for each of said sets of piston assemblies rotatably mounted in said housing, each of said eccentrics having a central pinion gear drivingly engaging said bevel gear and an offset connection to which the connecting rods of each corresponding set of piston assemblies are drivingly connected.

5. In an air motor: supply and exhaust means; an elongate housing; a central axial through bore formed in said housing; a hollow cylinder having internal screw threads mounted within said central bore; a screw reciprocatingly mounted in said hollow cylinder; a plurality of symmetrically related sets of axially directed opposed cylinder bores in said housing spaced about said central axial bore each having inlet and outlet ports at their opposed ends; a piston operatively disposed in each of said cylinder bores, each of said pistons being drivingly connected to rotatably actuate said hollow cylinder; and rotary plate valve means cooperating with the inlet and outlet ports in the opposed ends of said cylinders to communicate said cylinders in timed relation with said supply and exhaust means, said valve means being connected for actuation by said hollow cylinder.

6. In an air motor: a housing; a central axially directed bore formed through said housing; a hollow cylinder having internal screw threads and an external substantially centrally located annular bevel gear rotatably mounted in said bore; a screw mounted for axial actuation in said hollow cylinder; a plurality of sets of opposed axially directed cylinder bores mounted about said central bore; supply and exhaust means for said cylinder bores; a set of piston assemblies including connecting rods operatively disposed in a corresponding set of said cylinder bores; and an eccentric for each of said sets of piston assemblies rotatably mounted in said housing, each of said eccentrics having a central pinion gear drivingly engaging said bevel gear and an offset connection to which the connecting rods of each corresponding set of piston assemblies are drivingly connected.

7. In an air motor: supply and exhaust means; a housing; a central axial bore formed in said housing; a rotatably actuated hollow cylinder having internal screw threads mounted in said central bore; a screw mounted in said hollow cylinder for axial actuation thereby; a plurality of sets of axially directed opposed cylinder bores in said housing symmetrically spaced about said central axial bore, said cylinder bores having ports in their opposed ends connecting said bores to said supply and exhaust means; a piston operatively disposed in each of said cylinder bores, each of said pistons being drivingly connected to rotatably actuate said hollow cylinder; and rotatably actuated plate valve means communicating said cylinder bore ports with said supply and exhaust means in timed relation for the sequential actuation of the pistons mounted in said cylinder bores, said valve means being connected for actuation by said hollow cylinder.

References Cited in the file of this patent
UNITED STATES PATENTS

| | | |
|---|---|---|
| 1,065,604 | Gray | June 24, 1913 |
| 1,804,921 | Ellyson | May 12, 1931 |
| 2,052,472 | Hyman | Aug. 25, 1936 |
| 2,419,600 | Sejarto | Apr. 29, 1947 |
| 2,421,868 | Bovee | June 10, 1947 |
| 2,603,194 | Hall | July 15, 1952 |
| 2,948,265 | Jensen et al. | Aug. 9, 1960 |
| 3,084,513 | Casassa et al. | Apr. 9, 1963 |